United States Patent [19]
Gilbert

[11] Patent Number: 6,052,253
[45] Date of Patent: *Apr. 18, 2000

[54] DUAL FORMAT TAPE DRIVE

[75] Inventor: Timothy G. Gilbert, Vermillion, S. Dak.

[73] Assignee: Gateway 2000, Inc., North Sioux City, S. Dak.

[ * ] Notice: This patent issued on a continued prosecution application filed under 37 CFR 1.53(d), and is subject to the twenty year patent term provisions of 35 U.S.C. 154(a)(2).

[21] Appl. No.: 08/976,783

[22] Filed: Nov. 24, 1997

[51] Int. Cl.[7] ............................. G11B 5/008; G11B 5/55
[52] U.S. Cl. ............................................. 360/94; 360/106
[58] Field of Search ...................... 360/94, 96.1, 105–106

[56] References Cited

U.S. PATENT DOCUMENTS

| | | | |
|---|---|---|---|
| D. 270,055 | 8/1983 | Irwin et al. | D14/109 |
| 5,214,550 | 5/1993 | Chan | 360/97.01 |
| 5,218,487 | 6/1993 | Richmond | 360/27 |
| 5,285,324 | 2/1994 | Weigand et al. | 360/3 |
| 5,296,977 | 3/1994 | Fujioka | 360/63 |
| 5,309,297 | 5/1994 | Funahashi | 360/67 |
| 5,384,673 | 1/1995 | Yoshioka et al. | 360/72.2 |
| 5,566,037 | 10/1996 | Kasai | 360/94 |
| 5,675,451 | 10/1997 | Alayer | 360/94 |

FOREIGN PATENT DOCUMENTS

| | | |
|---|---|---|
| 0381266 | 1/1990 | European Pat. Off. . |
| 0427369 | 4/1990 | European Pat. Off. . |
| 0553844 | 1/1993 | European Pat. Off. . |
| 0557726 | 1/1993 | European Pat. Off. . |
| 57-127973 | 8/1982 | Japan . |
| 05101489 | 4/1993 | Japan . |

*Primary Examiner*—A. J. Heinz
*Attorney, Agent, or Firm*—Schwegman, Lundberg, Woessner & Kluth, P.A.; Anthony Claiborne

[57] ABSTRACT

A dual tape drive system is described for accepting either a digital data tape cartridge for data backup or a standard audio cassette tape for audio play and record. A single dual purpose tape head may be utilized for interfacing with both digital data tape cartridges and audio cassette tapes. In an alternative embodiment of the dual tape drive system, separate tape heads may be utilized such that an "audio" head is dedicated to cassette tapes while a "data" head is dedicated to digital tape cartridges. The dual tape drive system may exist as a stand alone device or may be integrated into a computer system whereby the tape drive is controlled through a keyboard operatively coupled to the computer system.

32 Claims, 4 Drawing Sheets

DUAL FORMAT TAPE DRIVE

TECHNICAL FIELD OF THE INVENTION

The present invention relates generally to tape drives and in particular to a dual tape drive.

BACKGROUND OF THE INVENTION

A large percentage of personal computers sold today have high quality graphics and multimedia capability. Fueling user demand has been the introduction of lower cost 32-bit processors and an increase in the number of applications software available for these systems. Because of their computational and graphics power, many of these computer systems employ data-intensive applications such as electronic publishing, computer-aided design and scientific research.

As a result of utilizing such applications, many computer users generate and accumulate large file sets which need to be "backed up" for future use in case the original files become lost or damaged. A common method of backing up computer data is by the use of a digital tape device. A digital tape device can either be internal to the computer, i.e., occupying a device or "options" bay, or may exist as an external stand alone device. When an internal digital tape device is utilized, the available number of computer device bays is reduced. This in turn limits computer growth potential, particularly when device bays are typically already occupied by a CD ROM drive and a 3½ inch floppy disk drive.

Parallel to the need for backing up computer files, multimedia is perhaps the fastest growing application for computer systems. Consequently, computers are being utilized to produce sound, with many systems able to compose music. A drawback to this advantage, however, is that personal computers are not equipped to receive standard audio cassettes to record composed music or to even play music previously recorded onto a standard cassette tape.

A problem arises when a computer user using a multimedia application wishes to record music or other audio sounds onto a standard audio cassette tape. The problem arises because the use of cassette tapes to record music from a computer system are not readily available. The use of audio cassette tapes by a computer system would permit music to be played by the computer system directly and also by a variety of other devices, such as walkmans, audio tape decks in cars, portable cassette players, etc. Therefore, a device compatible with a computer system is needed whereby record and play functions associated with audio cassette decks are provided to the user.

However, a solution of simply providing a separate audio cassette tape drive presents several problems since this would require an additional computer device bay slot and also result in a redundancy of circuitry and devices. First problem, for example, computer device bay slots are generally limited. This is particularly evident when current computer systems are typically equipped with a 3½ inch floppy disk drive, a CD ROM drive, a digital tape back up device, a digital video disk (DVD) and Zip drives. Secondly, a separate audio cassette tape drive requires its own circuitry and devices. For example, a motor, an interface to the motherboard, a digital signal processor (DSP), and an amplifier all would be required for a separate audio cassette tape drive. These redundant parts and circuitry to support these parts results in increased manufacturing costs.

Therefore, there is a need for a computer system to be able to record computer generated music onto an audio cassette tape. Specifically, there is a need for such a system that does not require an additional computer bay slot and redundant parts and circuitry.

SUMMARY OF THE INVENTION

The above mentioned problems associated with the lack of ability to record and play music from a computer system onto and from a standard cassette tape, where the computer system usually has a limited number of computer device bay slots available for expansion are addressed by the dual tape drive system which will be understood by reading and studying the following specification.

The invention permits a computer system to play from and record to standard audio cassette tapes without utilizing an additional computer bay device slot. With the expansion of multimedia providing the ability for a computer user to create their own music, a dual tape drive system allows the user to record and playback composed music without requiring a dedicated computer bay device slot, where such slots are limited on a computer system. By adding audio cassette functions to a digital tape backup device, a single computer device bay supports both the "backing up" of digital data within the computer system and also provides playback and record features associated with audio cassette tapes.

In particular, the present invention describes a dual tape drive system, comprising a housing receptive to a tape having either a data or analog format type, a first tape head having a digital reproducing circuit for communicating data signals with a tape having a digital format type, a second tape head having an analog signal reproducing circuit for communicating analog signals with the tape having an analog format type, and a selector mechanism to switch between the first and the second tape heads dependent on the format type of the tape.

An embodiment of the present invention is integrated into a computer system, wherein the dual tape drive system is controlled through a keyboard operatively coupled to the computer. The dimensions of the dual tape drive system are compatible with a standard computer bay device slot. The dual tape drive system further comprising an eject button which ejects either a digital tape cartridge or an audio cassette tape. In addition, the dual tape drive system further comprising a volume control and an audio jack.

In another illustrative embodiment, the present invention is a dual tape drive system comprising a tape head positionable against a tape having either a digital or data format type, an electronic circuit connected to the tape head having both a digital signal reproducing circuit for communicating data signals with a digital format type tape and an analog signal reproducing circuit for communicating audio signals with an analog format type tape, and a mechanism to position the tape head dependent on the data format type of the tape.

In a further embodiment of a dual tape drive system having a dual purpose tape head, a method of supporting both digital and audio tapes, comprising the steps of inserting a tape having a data format type into the tape drive system, the system initially configured in a digital mode, switching the system to an analog mode upon the format type of the inserted tape being an analog format type, and sliding the tape head and interfacing an audio tape mechanism with the tape upon switching to the analog mode.

In a still further embodiment of a dual tape drive system having a first tape head and a second tape head, a method of supporting both digital and audio tapes, comprising the steps of inserting a tape having a data format type into the tape drive system, determining the data format type of the inserted tape, positioning the first tape head against the tape if the data format type is a digital tape, positioning the second tape head against the tape if the data format type is an audio tape, and activating the positioned tape head for communicating with the tape.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense.

Figure 1B:
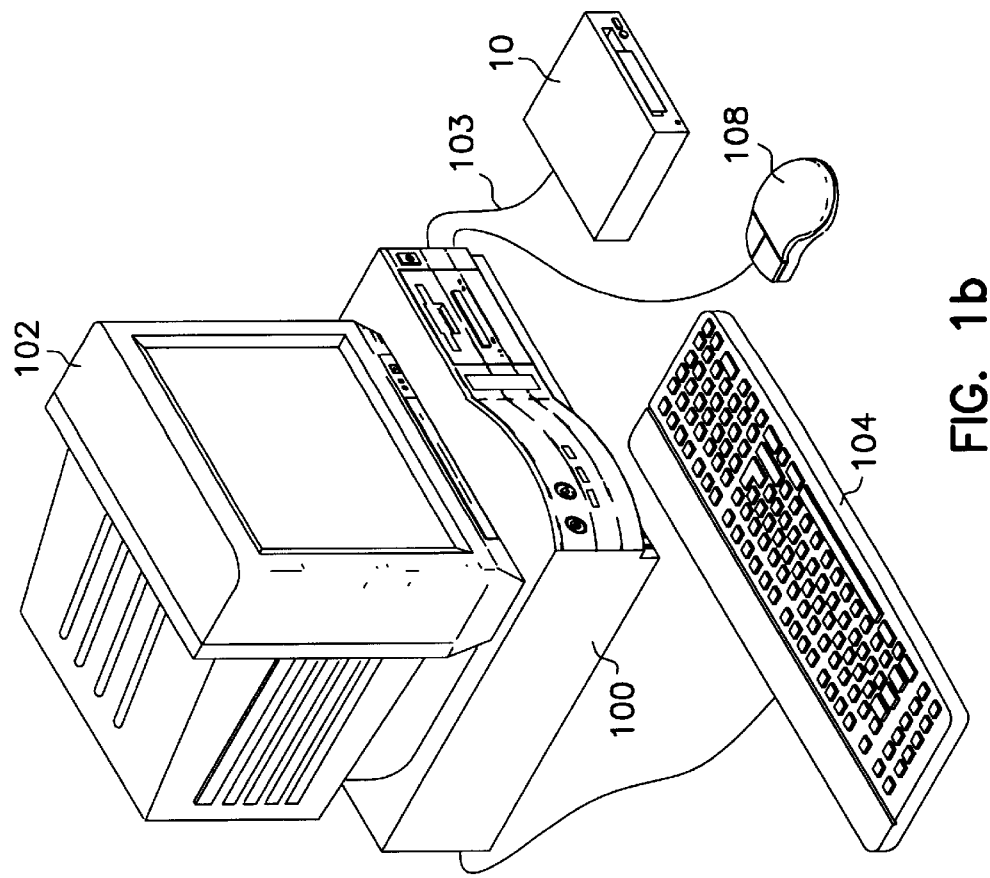
FIGS. 1A and 1B are isometric views of a typical computer system in conjunction with which embodiments of the dual tape drive system may be implemented.
Figure 1A:
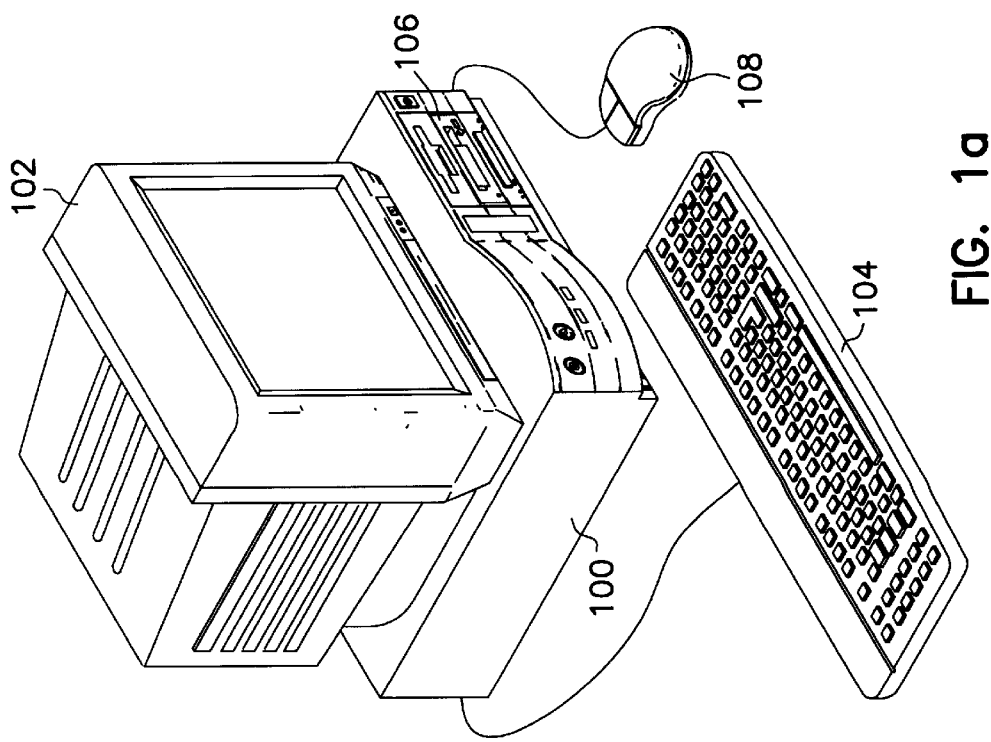

Referring to FIGS. 1A and 1B, diagrams of a typical computer system are shown. In one embodiment, dual tape drive system 10 is internal to computer 100, as shown in FIG. 1A. Dual tape drive system 10 is positioned within computer bay device slot 106. In an alternative embodiment, dual tape drive system 10 is external to computer 100, as shown in FIG. 1B. In this configuration, dual tape drive system 10 communicates with computer 100 via serial interface 103. However, dual tape drive system 10 is not limited to a serial interface and other types of interfaces are acceptable.

Computer 100 is coupled to monitor 102, pointing device 108, and keyboard 104. Computer 100 further includes a microprocessor, random access memory (RAM), read only memory (ROM), and one or more storage devices, such as a hard disk drive, a floppy disk drive (into which a floppy disk can be inserted), an optical disk drive, and a digital tape cartridge drive. Excluding the internal hard disk drive, the storage devices are compatible with device bay slots 106. The invention is not particularly limited to any type of computer 100. The construction and operation of such computers are well known in the art.

Monitor 102 permits the display of information for viewing by a user of computer 100. Dual tape drive system 10 is likewise not limited to any particular monitor 102. Monitors 102 include cathode ray tube (CRT) displays, as well as flat panel displays such as liquid crystal displays (LCDs). Pointing device 108 permits the control of the screen pointer provided by the graphical user interface of operating systems such as versions of MICROSOFT WINDOWS brand operating system. Dual tape drive system 10 is not limited to any particular pointing device 108. Such pointing devices include mouses, touch pads, trackballs and point sticks. In one embodiment, computer 100 is a Gateway 2000, Inc., desktop personal computer, monitor 102 includes a super-VGA CRT display and pointing device 108 is a mouse. Finally, keyboard 104 entry of textual information into computer 100, as known within the art, is not limited to any particular type of keyboard.

Figure 2A:
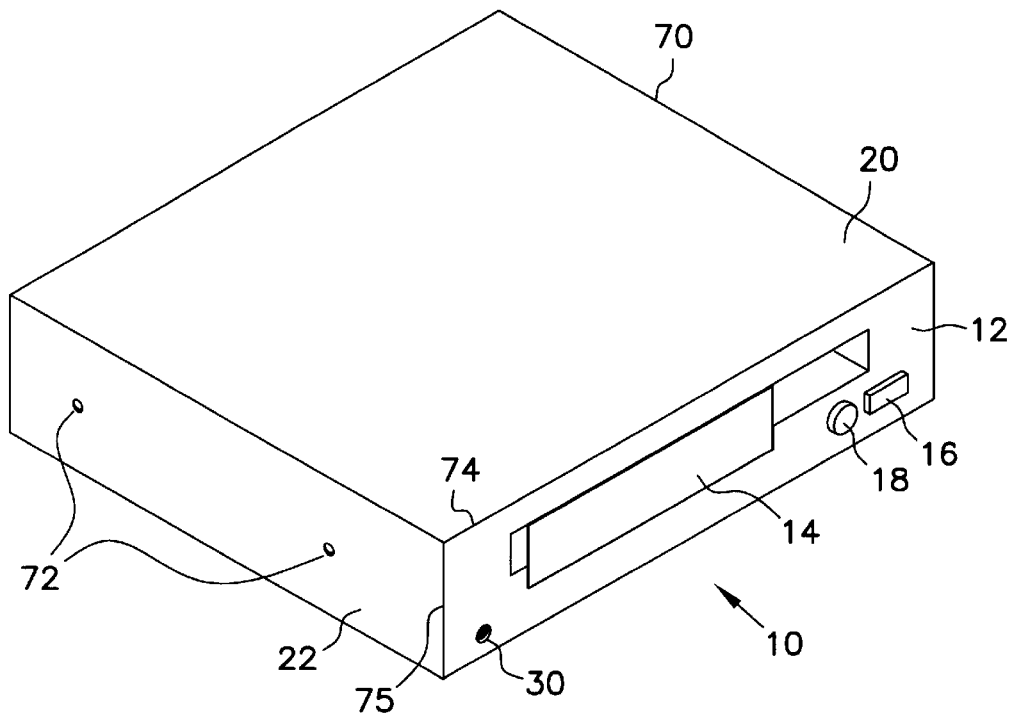
FIG. 2A is an isometric view of the dual tape drive system utilizing dual tape heads.
Figure 2B:
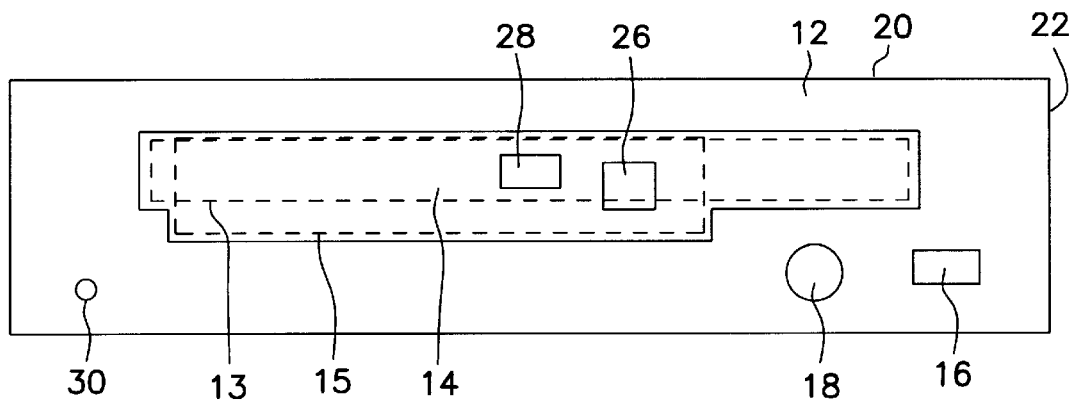
FIG. 2B is a front view of a faceplate of the dual tape drive system utilizing dual tape heads.

FIG. 2A is an isometric view of dual tape drive system 10 utilizing dual tape heads and FIG. 2B is a front view of faceplate 12. As shown in FIG. 1B, the dual tape heads are "data" tape head 26 and "audio" tape head 28. Opening 14 is configured to accommodate both a standard audio cassette tape and a digital data tape. Outline 13 represents position of a digital data tape within opening 14 and outline 15 represents position of an audio cassette tape within the same opening 14. However, only one tape may be inserted at a time.

Within opening 14, tape heads 26,28 are shown in their respective positions. Tape heads 26,28 are located directly where contact is to be made with the magnetic tape corresponding to either the digital data tape or the analog audio cassette tape. Thus, data tape head 26 illustrates the position for engagement with a digital data tape while audio tape head 28 is likewise in position for engagement with a standard audio cassette tape. Tape heads 26,28 will be discussed in more detail within this specification, as well as alternative embodiments of dual tape drive system 10.

Various controls are also located on faceplate 12. Eject button 16 supports ejection of which ever type tape data format may be inserted through opening 14, either a digital data tape or an audio cassette tape. In addition, volume control 18 and headset jack 30 are included for audio control of recorded music or other sound being played back on an inserted audio cassette tape. These controls are active for a cassette tape when audio tape head 28 is activated in the play mode. Headset jack 30 is compatible with available standard type headset plugs.

The dimensions of faceplate 12 are preferably compatible with dimensions of standard computer bay device slots 106. Similarly, the depth 70 of invention 10 is compatible with the depth normally available for these standard computer bay device slots 106. Faceplate 12 attaches to housing 20, wherein housing 20 encloses invention 10. For compatibility with computer device bay slot 106, one embodiment of faceplate 12 measures 6 inches along edge 74 by 1.5 inches along edge 75. Housing 20 has attachment locations 72 on parallel sides 22 for securing dual tape drive system 10 within computer bay device slot 106. Exterior dimensions of invention 10 are not limited to those of computer bay device slot 106 and may vary accordingly.

Even with external functions provided on faceplate 12, dual tape drive system 10 is primarily controlled by computer 100 through keyboard 104, which is operatively coupled to computer 100. Commands from keyboard 104 include, but are not limited to the following: volume control, record, play, pause, fast forward and rewind. Basically, any functions provided on a standard cassette deck may also be provided in dual tape drive system 10, and control is implemented through computer system 100 and keyboard 104. Furthermore, the control functions associated with the digital data tape are likewise implemented through computer system 100 and keyboard 104.

Figure 3:
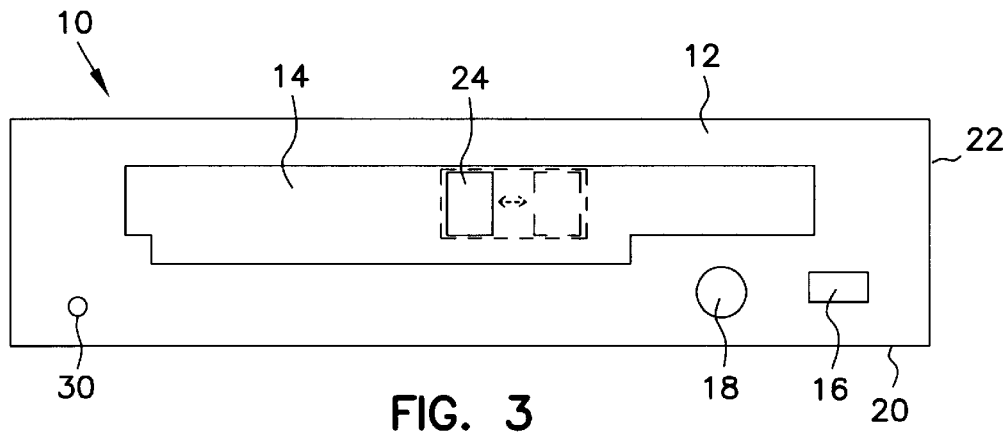
FIG. 3 is a front view of an alternative embodiment of a faceplate utilizing a dual purpose tape head.

FIG. 3 is a front view of an alternative embodiment of faceplate 12 utilizing a single dual purpose tape head 24. Tape head 24 can accommodate either a digital data tape or an audio cassette tape. The configuration of opening 14 is substantially the same when single tape head 24 is utilized as compared to the configuration of opening 14 supporting dual tape heads 26 and 28.

In the alternative embodiment of dual tape drive system 10 shown in FIG. 3, dual purpose tape head 24 slides across opening 14 depending on which type of tape is inserted. Mechanization for the sliding of tape head 24 within opening 14 may be mechanically or electronically implemented, where implementation is well known to one skilled in the art.

In comparison, the single tape heads 26 and 28 shown in FIG. 2B remain in a relatively fixed position to their respective point of contact with the exposed magnetic tape contained within either a digital data tape or an audio cassette tape. Activation of tape heads 26,28 is thus dependent upon which type of tape is inserted thru opening 14. A selector mechanism for activation of tape heads 26,28 may be mechanically or electronically implemented, where implementation is well known to one skilled in the art.

Tape heads 26,28 and 24 are all analog devices that are functionally equivalent. The main difference lies in the corresponding electronics (not shown) interfaced directly with tape heads 26,28 and 24. For instance, analog circuitry is required for audio tape head 28 while digital circuitry is required for digital tape head 26, or in the case of dual purpose tape head 24, both analog and digital circuitry is required by tape head 24. Analog and digital circuitry applicable to tape heads 26,28 and 24 of the dual tape drive system 10 are well known in the art. The most significant modification required would be in the interface of the electronics to support dual purpose tape head 24. For one skilled in the art, this modification would be relatively minor and may be easily accomplished to support such an alternative embodiment of dual tape drive system 10 using single dual purpose tape head 24.

Even though tape heads 26,28 and 24 are analog devices and are functionally equivalent, there is a slight difference in the frequency response required between analog and digital tape applications. For example, analog recordings require audio tape head 28 and the audio portion of tape head 24 to be responsive over the frequency bandwidth typically associated with that of human recognition: normally 10 to 17,000 Hz. In contrast, data tape head 26 and the data portion of tape head 24 operates at two discrete frequencies. Digital signals typically employ frequency shifting between two discrete frequencies non-harmonically related to produce the high and low logic states used to record data onto a digital tape.

Figure 4:
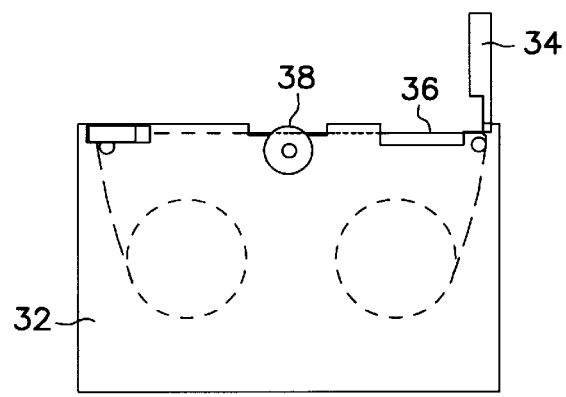
FIG. 4 is a top view of a digital data tape.

FIG. 4 is a top view of digital data tape 32. There are many styles and types of digital tapes 32 available and dual tape drive system 10 could be configured to support any one of these types. Digital tape 32 is a mini-data cartridge that holds 120 MB of data. When digital tape 32 is inserted into opening 14, tape door 34 is physically opened upon insertion into opening 14 to expose magnetic tape 36. Methods of opening tape door 34 are well known in the art. Data tape drive wheel 38 is then engaged by the dual tape drive system 10 to move magnetic tape 36 to a desired location for reading or writing digital data.

Figure 5:
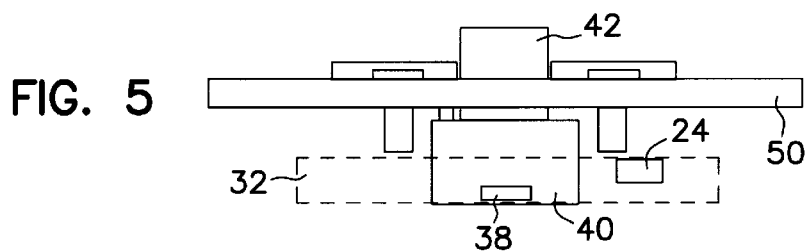
FIG. 5 is a front view of a digital data tape engaged by a drive wheel and a dual purpose tape head.

FIG. 5 is a front view of digital data tape 32 engaged by drive wheel 40 and dual purpose tape head 24. The view represented by FIG. 5 is of data tape 32 after having been inserted through opening 14 of faceplate 12. As data tape 32 comes to rest inside dual tape drive system 10, tape door 34 is opened to expose magnetic tape 36. Dual purpose tape head 24 then slides across opening 14 to exposed magnetic tape 36 for reading or writing data.

Magnetic tape 36 is rotated or moved with respect to data tape head 24 by internal drive wheel 40 which engages data tape drive wheel 38. Internal drive wheel 40 is controlled by drive motor 42. Control of drive motor 42 for reading and writing data with respect to data tape 32 is well known in the art. When data tape 32 is inserted into dual tape drive system 10, audio tape mechanism 50 is pivoted up and out of the way when not in use.

Figure 6:
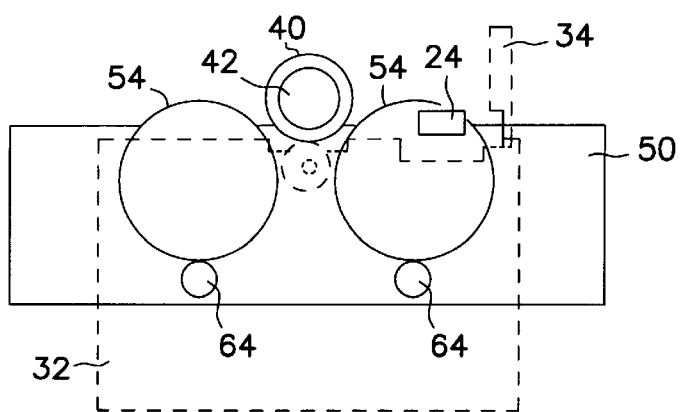
FIG. 6 is a top view of a drive motor in the "data" mode position with respect to an audio tape mechanism.

FIG. 6 is a top view of drive motor 42 in the "digital" mode position, also known as the "data" mode position, with respect to audio tape mechanism 50. As shown in FIG. 6, drive motor 42 is centered between audio tape drives 54. Audio tape mechanism 50, which includes audio tape drives 54 and spindles 64, is pivoted up and out of the way from drive wheel 40, drive motor 42 and digital data tape 32 to permit operation of digital data tape 32. Thus, audio tape drives 54 and spindles 64 are not utilized when drive motor 42 is engaged with data tape drive wheel 38.

The default position of audio tape mechanism 50 and tape head 24 of the dual tape drive system 10 supports digital data tape 32. For instance, insertion of digital data tape 32 does not require movement of audio tape mechanism 50 since the default position already has it moved so as not to be restrictive upon drive wheel 40 and drive motor 42. Drive wheel 40 and drive motor 42 moves in position depending upon which tape is inserted into opening 14, but the default position supports digital data tape 32. In other words, a selector mechanism switches between digital tape head 26 and analog tape head 28 dependent on the data format type of the inserted tape. Similarly, the default position of tape head 24 is in direct relation to exposed magnetic tape 36.

Figure 7:
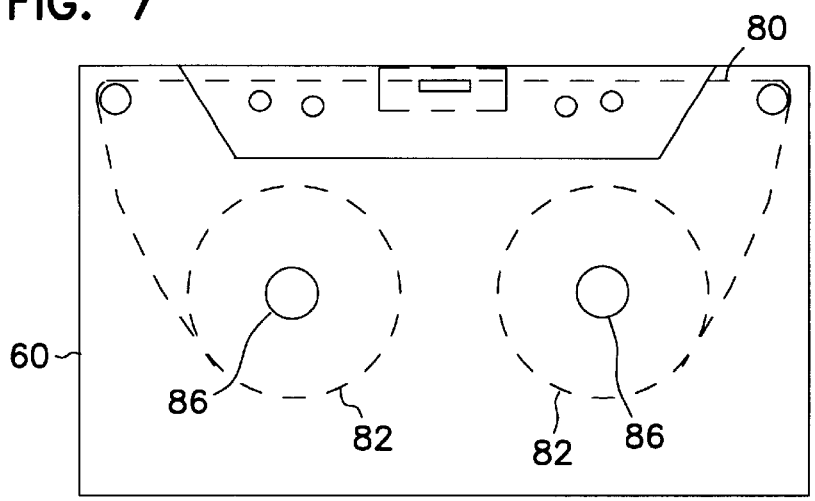
FIG. 7 is a top view of a standard audio cassette tape.

FIG. 7 is a top view of standard audio cassette tape 60. Audio cassette tape 60 comprises magnetic tape 80 which is rotated around audio tape wheels 82 to a desired location for reading or writing analog data. Audio tape wheels 82 are rotated by spindles 64 which are coupled to audio cassette tape 60 via openings 86. The mechanics of audio cassettes tape 60 are well known to one skilled in the art. When audio cassette tape 60 is inserted into opening 14, magnetic tape 80 is exposed to make contact with tape head 24 or tape head 28, depending on the embodiment of dual tape drive system 10.

Figure 8:
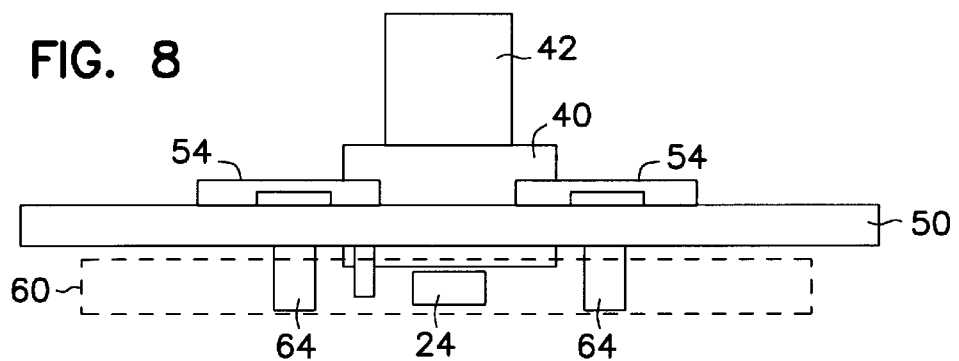
FIG. 8 is a front view of an audio tape mechanism engaged with an audio cassette tape and a dual purpose tape head.

FIG. 8 is a front view of audio tape mechanism 50 engaged with audio cassette tape 60. When audio cassette tape 60 is inserted through opening 14 of faceplate 12, several things with respect to the selector mechanism happen. First, but not necessarily in this order, audio tape mechanism 50 pivots down into position to make contact with audio cassette tape 60. Spindles 64, which extend directly from audio tape drives 54, are inserted into the corresponding openings 86 in cassette tape 60. Secondly, tape head 24 slides from the data tape position to the audio cassette position. Exposure of magnetic tape 80 contained within cassette tape 60 is typically in the center of tape 60, which is where tape head 24 is positioned. Thirdly, internal drive wheel 40 and drive motor 42 are moved from the data mode position to make contact with one of audio tape drives 54.

In this embodiment of dual tape drive system 10, drive motor 42 is moved to make contact with audio drive motor 54 to rotate magnetic tape 80 via spindles 64 to a desired position. Once contact is made, audio tape drives 54 are connected such that rotation of one of the audio drives 54 results in rotation of the other audio drive 54. Control of audio tape mechanism 50 for reading and writing data with respect to cassette tape 60 is well known to one skilled in the art. Furthermore, the user can essentially perform any function currently supported by a cassette tape deck in the dual tape drive system 10 by implementation through computer 100 and keyboard 104, which is operatively coupled to computer 100.

Figure 9:
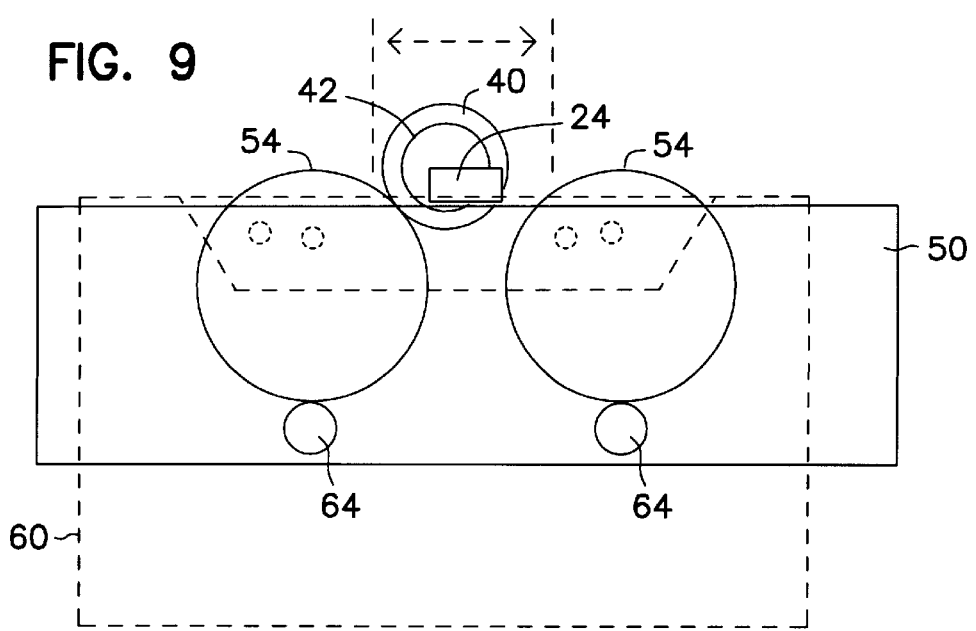
FIG. 9 is a top view of a drive motor in the "audio" mode position with respect to an audio tape mechanism.

FIG. 9 is a top view of drive motor 42 in the "audio" mode position with respect to audio tape mechanism 50. Drive motor 42 and internal drive wheel 40 are centered between audio tape drives 54. Audio tape drives 54 are gears or wheels that act as a medium between internal drive wheel 40 and spindles 64. For "audio" mode position, internal drive wheel 40 contacts audio tape drive 54 to rotate via spindles 64 magnetic tape 80 contained within audio cassette tape 60.

Audio tape drives 54 are an interim wheel or gear between internal drive wheel 40 and spindles 64. Depending upon the operation of drive motor 42, when drive wheel 40 connects with audio tape drives 54, drive wheel 40 either drives magnetic tape 80 in the forward direction or drives magnetic tape 80 in the reverse direction. In the case of automatically "flipping" to the other side of cassette tape 60, either one of the two audio tape drives 54 forces magnetic tape 60 in the forward or reverse direction.

A dual tape drive system 10 that can accept either a digital data tape cartridge for data backup or a standard audio cassette tape for audio play and record has been described. A single dual purpose tape head 24 having both digital and analog reproducing signal circuits for reading and writing corresponding data and audio signals may be utilized. In an alternative embodiment of dual tape drive system 10, separate tape heads may be utilized such that an audio head 28 having analog reproducing signal circuits is dedicated to cassette tapes while a data head 26 having digital reproducing circuits is dedicated to digital data tape cartridges. Dual tape drive system 10 may exist as either a stand alone device or may be integrated into computer system 100. If integrated into computer system 100, dimensions are compatible with standard computer drive bay slot 106. Furthermore, tape drive device 10 is controlled through keyboard 104 operatively coupled to computer system 100.

Although specific embodiments have been illustrated and described herein, it will be appreciated by those skilled in the art that any arrangement which is calculated to achieve the same purpose may be substituted for the specific embodiment of the dual tape drive system. This application is intended to cover any adaptations or variations of the dual tape drive system. Therefore, it is manifestly intended that this invention ne limited only by the following claims and equivalents In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense.

What is claimed is:

1. A dual tape drive system, comprising:
    a housing receptive to a single tape having either a digital or analog format type;
    a first tape head capable of communicating data signals with a tape having a digital format type, and capable of movement;
    a second tape head capable of communicating analog signals with a tape having an analog format type, and capable of movement, the movement of the second tape head is independent of the movement of the first tape head; and
    a selector mechanism to switch between the first and the second tape heads dependent on the format type of the tape positioned in the housing.

2. The dual tape drive system of claim 1, wherein the first tape head is responsive to a digital tape cartridge for data backup.

3. The dual tape drive system of claim 1, wherein the second tape head is responsive to an audio cassette tape for audio play and record.

4. The dual tape drive system of claim 1, further comprising an audio tape mechanism for interfacing with the tape upon the selector mechanism selecting the second tape head.

5. The dual tape drive system of claim 1, further comprising a drive wheel for interfacing with the tape upon the selector mechanism selecting the first tape head and for interfacing with the audio tape mechanism upon the selector mechanism selecting the second tape head.

6. The dual tape drive system of claim 5, further comprising a drive motor operatively coupled to the drive wheel.

7. The dual tape drive system of claim 1 is integrated into a computer system.

8. The dual tape drive system of claim 1 is controlled through a keyboard operatively coupled to a computer system.

9. The dual tape drive system of claim 7, wherein the housing has dimensions compatible with a standard computer bay drive slot.

10. The dual tape drive system of claim 1, further comprising an eject button for ejecting the tape.

11. The dual tape drive system of claim 1, further comprising a volume control.

12. The dual tape drive system of claim 1, further comprising an audio jack.

13. A tape drive system, comprising:
    a single dual purpose tape head positionable against a tape having either a digital or analog format type, wherein the tape is positioned in a single predetermined location;
    an electronic circuit connected to the tape head having both a digital signal reproducing circuit for communicating data signals with a digital format type tape and an analog signal reproducing circuit for communicating audio signals with an analog format type tape; and
    a mechanism to position the tape head dependent on the data format type of the tape.

14. The dual tape drive system of claim 13, wherein the tape head is responsive to a digital tape cartridge for data backup.

15. The dual tape drive system of claim 13, wherein the tape head is responsive to an audio cassette tape for audio play and record.

16. The dual tape drive system of claim 13, wherein the dual tape drive system is integrated into a computer system.

17. The dual tape drive system of claim 16, wherein the dual tape drive system is controlled through a keyboard operatively coupled to the computer system.

18. The dual tape drive system of claim 17, further comprising a housing having dimensions compatible with a standard computer device bay.

19. The dual tape drive system of claim 13, further comprising an eject button for ejecting the tape.

20. The dual tape drive system of claim 13, further comprising a volume control.

21. The dual tape drive system of claim 13, further comprising an audio jack.

22. In a dual tape drive system having a single dual purpose tape head, a method of supporting both digital and analog tapes, comprising the steps of:
   inserting a tape into the dual tape drive system, the system initially configured in a digital mode;
   switching the system to an analog mode upon the data format type of the inserted tape being an analog format type; and
   positioning the single dual purpose tape head and interfacing an audio tape mechanism with the tape upon switching the system to the analog mode.

23. The method of claim 22 further including the step of providing an audio signal output to an audio jack.

24. In a dual tape drive system having a first tape head and a second tape head, a method of supporting both digital and analog tapes, comprising the steps of:
   inserting a single tape into the dual tape drive system, the dual tape drive system having a maximum capacity of a single tape;
   determining the data format type of the inserted tape;
   positioning the first tape head against the tape if the data format type is a digital tape;
   positioning the second tape head against the tape if the data format type is an analog tape; and
   activating the positioned tape head for communicating with the tape.

25. The method of claim 24 further including the step of providing an audio signal output to an audio jack.

26. A tape drive system, comprising:
   receiver means for receiving a single tape cartridge, the receiver having a maximum capacity of a single tape cartridge;
   head means for contacting the media tape contained in a single tape cartridge inserted in the receiver means, wherein the head means is operable with either digital or analog format type media;
   communication means for communicating data signals with a digital format type tape and for communicating audio signals with an analog format type tape, the communication means coupled to the head means; and
   positioning means for positioning the head means to contact the tape media depending on the data format type of the tape, the positioning means coupled to the head means.

27. A dual tape drive system, comprising:
   a housing receptive to a single tape having either a data or analog format type;
   a first tape head capable of communicating data signals with a tape having a digital format type;
   a second tape head capable of communicating analog signals with a tape having an analog format type;
   a selector mechanism to switch between the first and the second tape heads dependent on the format type of the tape positioned in the housing; and
   wherein the housing, the first tape head, the second tape head and the selector mechanism are integrated with a computer system.

28. The dual tape drive system of claim 27, wherein the housing has dimensions compatible with a standard computer bay drive slot.

29. A computer system, comprising:
   a computer;
   a keyboard operatively coupled to the computer;
   a dual tape drive system, the dual tape drive system comprising:
      a housing receptive to a single tape having either a data or analog format type;
      a first tape head capable of communicating data signals with a tape having a digital format type;
      a second tape head capable of communicating analog signals with a tape having an analog format type; and
      a selector mechanism to switch between the first and the second tape heads dependent on the format type of the tape positioned in the housing; and
   wherein the dual tape drive system is controlled by the keyboard.

30. A tape drive system, comprising:
   a tape head positionable against a tape having either a digital or analog format type, wherein the tape is positioned in a single predetermined location;
   an electronic circuit connected to the tape head having both a digital signal reproducing circuit for communicating data signals with a digital format type tape and an analog signal reproducing circuit for communicating audio signals with an analog format type tape;
   a mechanism to position the tape head dependent on the data format type of the tape; and
   wherein the tape head, the electronic circuit, and the mechanism to position the tape head are integrated with a computer system.

31. The tape drive system of claim 30, wherein a keyboard is operatively coupled to the computer system and further wherein the tape drive system is controlled through the keyboard.

32. The tape drive system of claim 31, further comprising a housing having dimensions compatible with a standard computer device bay.

* * * * *